(12) United States Patent (10) Patent No.: US 9,333,985 B2
Iwao (45) Date of Patent: May 10, 2016

(54) POWER STEERING SYSTEM, VEHICLE EQUIPPED WITH SAME, AND CONTROL METHOD THEREOF

(71) Applicant: ISUZU MOTORS LIMITED, Tokyo (JP)

(72) Inventor: Nobuyuki Iwao, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/401,159

(22) PCT Filed: May 15, 2013

(86) PCT No.: PCT/JP2013/063503
§ 371 (c)(1),
(2) Date: Nov. 14, 2014

(87) PCT Pub. No.: WO2013/172367
PCT Pub. Date: Nov. 21, 2013

(65) Prior Publication Data
US 2015/0105980 A1 Apr. 16, 2015

(30) Foreign Application Priority Data
May 17, 2012 (JP) ................................. 2012-113645

(51) Int. Cl.
*B62D 5/065* (2006.01)
*B62D 5/06* (2006.01)
(Continued)

(52) U.S. Cl.
CPC ................ *B62D 5/065* (2013.01); *B62D 5/064* (2013.01); *B62D 6/00* (2013.01); *B62D 6/007* (2013.01); *B62D 15/025* (2013.01); *B62D 15/029* (2013.01)

(58) Field of Classification Search
CPC .......... B60G 11/26; B60T 8/24; B62D 5/065; B62D 5/064; B62D 5/00; B62D 15/025; B62D 15/029; B62D 6/00
See application file for complete search history.

(56) References Cited

U.S. PATENT DOCUMENTS 4,974,875 A * 12/1990 Sugasawa .......... B60G 17/0162
280/5.506
6,009,364 A * 12/1999 Wada .................. B60T 8/17636
701/43
(Continued)

FOREIGN PATENT DOCUMENTS

CN 101970279 A * 2/2011 ............. B62D 5/046
CN 101990509 A * 3/2011 ............. B62D 5/046
(Continued)

OTHER PUBLICATIONS
International Search Report mailed Aug. 13, 2013, in International Patent Application No. PCT/JP2013/063503.

*Primary Examiner* — Tuan C. To
(74) *Attorney, Agent, or Firm* — Staas and Halsey LLP (57) ABSTRACT

Power steering system including: an electric pump to supply fluid to a power steering unit; and an engine control unit (ECU) to control an amount of the fluid by a rotation speed of the electric pump. The ECU includes a first device for calculating an on-slope standby rotation speed and setting the electric pump to this speed when a vehicle is descending or ascending a slope. This speed is calculated by correcting a standby rotation speed of the electric pump corresponding to a vehicle speed with a slope correction value calculated according to a slope angle or a vehicle body angle. Accordingly, it is possible to supply the fluid with the electric pump and assist a steering operation to suppress both a jerky steering feeling due to insufficient steering force in slope descent and a lack of response in the steering operation due to excessive steering force in slope ascent.

13 Claims, 6 Drawing Sheets

(51) Int. Cl.
   *B62D 15/02* (2006.01)
   *B62D 6/00* (2006.01)

(56) References Cited

U.S. PATENT DOCUMENTS

| | | | |
|---|---|---|---|
| 6,092,618 A * | 7/2000 | Collier-Hallman | B62D 5/065 180/422 |
| 6,305,489 B1 * | 10/2001 | Kariatsumari | B62D 5/065 180/422 |
| 6,425,454 B1 * | 7/2002 | Chabaan | B62D 5/0463 180/443 |
| 7,363,134 B2 * | 4/2008 | Mitsuhara | B62D 5/064 180/422 |
| 9,211,907 B2 * | 12/2015 | Kubo | B62D 5/065 |
| 2006/0015230 A1 * | 1/2006 | Mitsuhara | B62D 5/065 701/42 |
| 2009/0120085 A1 * | 5/2009 | Yamaura | B60T 5/065 60/423 |
| 2009/0234526 A1 * | 9/2009 | Taki | B60T 7/22 701/23 |
| 2010/0217469 A1 * | 8/2010 | Bach | B60T 7/122 701/31.4 |
| 2011/0022272 A1 * | 1/2011 | Hung | B62D 5/09 701/42 |
| 2011/0095714 A1 * | 4/2011 | Kagawa | F01C 20/00 318/400.21 |
| 2011/0212809 A1 * | 9/2011 | Tsutsui | B60W 10/02 477/5 |
| 2012/0247864 A1 * | 10/2012 | Kubo | B62D 5/09 180/422 |
| 2013/0138298 A1 * | 5/2013 | Derry | B62D 5/0481 701/42 |

FOREIGN PATENT DOCUMENTS

| | | |
|---|---|---|
| JP | 1-47347 | 10/1989 |
| JP | 2-27193 | 6/1990 |
| JP | 5-221330 | 8/1993 |
| JP | 2003-285748 | 10/2003 |

* cited by examiner

POWER STEERING SYSTEM, VEHICLE EQUIPPED WITH SAME, AND CONTROL METHOD THEREOF

CROSS-REFERENCE TO RELATED APPLICATIONS

This application is a U.S. National Stage Application, which claims the benefit under 35 U.S.C. §371 of PCT International Patent Application No. PCT/JP2013/063503, filed May 15, 2013, which claims the foreign priority benefit under 35 U.S.C. §119 of Japanese Patent Application No. 2012-113645, filed May 17, 2012, the contents of which are incorporated herein by reference.

TECHNICAL FIELD

The present invention relates to a power steering system which supplies hydraulic oil with an electric pump to assist a steering operation, a vehicle equipped with the power steering system, and a control method of the power steering system.

BACKGROUND ART

In recent years, vehicles are equipped with various assisting systems to reduce fuel consumption and make travelling of the vehicles smooth. A power steering system is one of such systems. The power steering system makes driving of a vehicle comfortable and makes driving operations easy and accurate.

Such power steering systems include an electric power steering system (hereafter, referred to as EPS system) which directly assists the steering operation with a motor (electric motor), an electro-hydraulic power steering system (hereafter, referred to as EHPS system) which assists the steering operation by supplying hydraulic pressure with an electric pump, and the like.

Since both systems can assist the steering operation with the motor which operates irrespective of an engine, the fuel consumption of the vehicle can be improved. Particularly, the EHPS system can provide operation feeling similar to that of a conventional hydraulic power steering system and is thus often provided in heavy-weight vehicles such as trucks.

Figure 5:
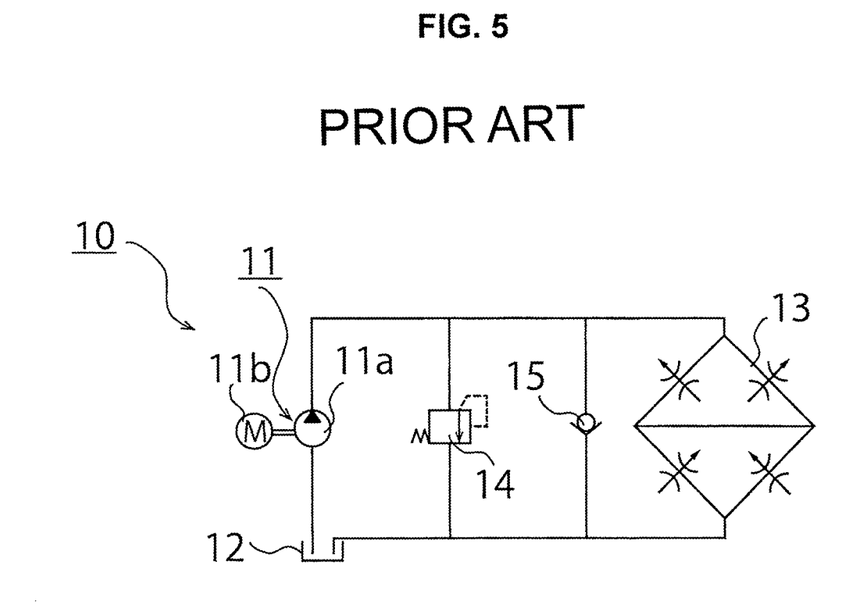
FIG. 5 is a hydraulic circuit diagram showing a conventional power steering system.

A control method of the EHPS system is described with reference to FIGS. 5 and 6. As shown in FIG. 5, an EHPS system 10 includes an electric pump 11 having a hydraulic pump 11a and a motor (electric motor) 11b, a reserve tank 12, a power steering unit 13 (steering assisting device) 13, a relief valve (line pressure control valve) 14, and a check valve 15.

Generally, the control of the EHPS system 10 is control of increasing and decreasing assisting force of the power steering unit 13 by supplying fluid (hydraulic oil) from the electric pump 11 to the power steering unit 13. It is possible to reduce energy consumed by the electric pump 11 by causing the electric pump 11 to supply the fluid when the assisting force of the power steering unit 13 is required and by stopping the supply of fluid when the assisting force is unnecessary, i.e. when the steering wheel is at a neutral position in the steering operation.

However, when the supply amount of fluid is set to zero, there is a risk of a seizure phenomenon occurring in the power steering unit 13, a wobbling phenomenon of the steering wheel occurring due to disturbance such as kickback in straight travelling, or a similar phenomenon occurring. Furthermore, setting the supply amount to zero has a problem that, in abrupt steering or the like, a long time is required for the supply amount of fluid to increase, and response delay occurs in the steering operation assist. In view of this, in cases such as where no steering operation is required, the electric pump 11 is controlled to supply the fluid to the power steering unit 13 at a minimum required standby flow rate.

Figure 6:
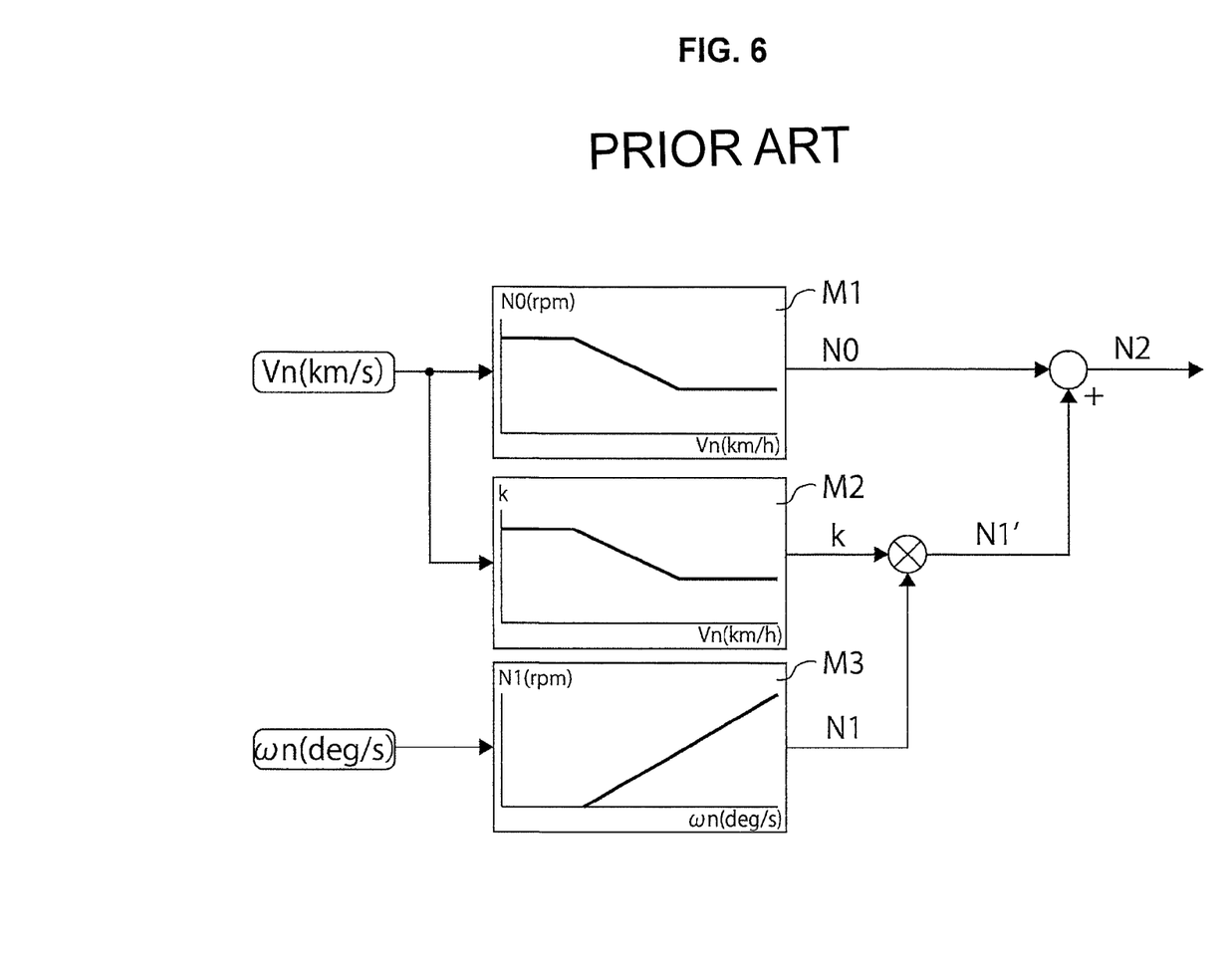
FIG. 6 is a block diagram showing a control method of the conventional power steering system.

Specifically, as shown in FIG. 6, first, a standby rotation speed N0 (rpm) of the electric pump 11 corresponding to the vehicle speed Vn (km/h) is basically defined by using a standby rotation speed map M1. In cases such as where no steering operation is required, the rotation speed of the electric pump 11 is controlled to reach the standby rotation speed N0.

When the steering wheel is operated, a vehicle speed coefficient (also referred to as vehicle speed responsiveness) k corresponding to the vehicle speed Vn is calculated from a vehicle speed coefficient map M2. Moreover, an additional rotation speed N1 (rpm) corresponding to a steering speed $\omega$n (deg/s) is calculated from a steering speed sense map M3.

Next, the calculated vehicle speed coefficient k and the calculated additional rotation speed N1 are multiplied by each other, and a steering correction value N1' (rpm) is thereby calculated. Then, the standby rotation speed N0 and the steering correction value N1' are added to each other, and a target rotation speed N2 (rpm) is thereby calculated. Thereafter, the rotation speed of the electric pump 11 is controlled to reach the target rotation speed N2.

However, the aforementioned control method has a problem that, when the vehicle is travelling on a slope, the steering force is insufficient in slope descent due to increase in a front axle load and steering is difficult. The aforementioned control method also has a problem that steering force is excessive in slope ascent and feeling of response is lost.

Regarding these problems, if the standby rotation speed N0 is increased to overcome the problem of insufficient steering force in slope descent for example, the electric energy of the electric pump 11 increases and the fuel consumption deteriorates. Moreover, the increase of the standby rotation speed N0 leads to increase of excessive steering force in slope ascent. Meanwhile, if the standby rotation speed N0 is reduced to overcome the problem of excessive steering force in slope ascent, the steering operation becomes difficult or impossible in slope descent due to insufficient steering force.

To counter the aforementioned problems which occur when the vehicle is travelling on a slope, there is a device which selects a gear ratio corresponding to a gradient of a road surface to achieve a good balance between turning performance in slope ascent and stability in slope descent (for example, see Patent Document 1). As in this device, in a vehicle equipped with the EPS system, increase and decrease of assist force from the motor is directly transmitted to the steering wheel. Accordingly, even if the road is sloped, the steering operation can be immediately assisted by increasing or decreasing the assist force in the steering operation.

Meanwhile, in the EHPS system, if the supply amount of fluid from the electric pump is increased and decreased according to the gradient of the road surface in the steering operation as in the aforementioned device, a long time is required for the fluid to be supplied from the electric pump to the power steering unit, and responsiveness to the steering operation deteriorates.

Particularly in a vehicle such as a cab-over truck, a front axle load which is the greatest factor of steering force changes greatly due to a short wheelbase and increase in the height of the center of gravity which is caused by loading of cargo. Accordingly, there occurs jerky feeling in the steering operation due to insufficient steering force in slope descent and lack of response in the steering operation due to excessive steering force in slope ascent. Hence, the assist force in the steering operation needs to be increased and decreased according to the gradient of a road surface and there is a need to consider control according to the gradient of the road surface.

PRIOR ART DOCUMENT

Patent Document 1: Japanese patent application Kokai publication No. Hei 5-221330

SUMMARY OF THE INVENTION

The present invention has been made in view of the problems described above and an object thereof is to provide a power steering system which can suppress both of jerky feeling in a steering operation due to insufficient steering force in slope descent of a vehicle and lack of response in the steering operation due to excessive steering force in slope ascent of the vehicle, a vehicle equipped with the power steering system, and a control method of the power steering system.

A power steering system of the present invention for solving the problems described above is a power steering system including: an electric pump configured to supply hydraulic oil to a steering assisting device configured to assist a steering performance of a steering wheel; and a control device configured to control a supply amount of the hydraulic oil by using a rotation speed of the electric pump, wherein the control device includes a first controller to calculate an on-slope standby rotation speed and to control the electric pump such that the electric pump is set to the on-slope standby rotation speed, when a vehicle is descending or ascending a slope, the on-slope standby rotation speed calculated by correcting a standby rotation speed of the electric pump corresponding to a vehicle speed with a slope correction value calculated according to a slope angle or a vehicle body angle.

In this configuration, it is possible to obtain assist force for a steering operation which is required when the vehicle is travelling on a slope, by increasing or decreasing a flow rate of the hydraulic oil, supplied from the electric pump to the steering assisting device, according to a slope angle or a vehicle body angle in a period when the vehicle is descending or ascending a slope and steering operation is unnecessary.

This can suppress both of jerky feeling in the steering operation due to insufficient steering force in slope descent and lack of response in the steering operation due to excessive steering force in slope ascent. This configuration is suitable particularly for a cab-over truck in which a front axle load changes greatly due to a short wheelbase and a high center of gravity resulting from loading of cargo.

Moreover, controlling the standby rotation speed of the electric pump according to the slope angle or the vehicle body angle can suppress pump drive loss and improve fuel consumption by reducing the pump drive loss without electric power consumed in a normal state being increased.

Note that, in a case of using a gravity sensor (G sensor), the slope angle or the vehicle body angle mentioned herein is a value inferred by using an arc-cosine. Meanwhile, in a case of using an angle sensor, the slope angle or the vehicle body angle is a detection value directly detected by the angle sensor. The slope angle or the vehicle body angle takes a negative value when the vehicle is descending a slope, and takes a positive value when the vehicle is ascending a slope.

Moreover, in the aforementioned power steering system, the control device may include a second controller to calculate a steering target rotation speed and to control the electric pump such that the electric pump is set to the steering target rotation speed, when the steering wheel is steered after control of the first controller, the steering target rotation speed calculated by correcting the on-slope standby rotation speed with a steering correction value corresponding to at least steering of the steering wheel. In this case, the electric pump is controlled to be set to the on-slope standby rotation speed corresponding to the slope angle or the vehicle body angle as described above when the vehicle is descending or ascending a slope, and the on-slope standby rotation speed is corrected according to the steering of the steering wheel. Accordingly, it is possible to achieve a good balance between responsiveness in the steering of the steering wheel in slope descent and a turning performance in slope ascent, without the responsiveness being deteriorated.

For example, when the correction according to the steering of the steering wheel and the correction according to the slope angle or the vehicle body angle is performed in the steering of the steering wheel, the change from the standby rotation speed is great and the responsiveness deteriorates. However, this problem can be easily solved by performing the correction according to the slope angle or the vehicle body angle before the correction according to the steering of the steering wheel.

In addition, in the aforementioned power steering system, the control device may include a slope correction value map storing the slope correction value based on the slope angle or the vehicle body angle, and the first controller may:
calculate the slope correction value from the slope correction value map, according to the slope angle or the vehicle body angle; and increase the standby rotation speed by the slope correcting value when the slope angle or the vehicle body angle indicates slope descent and decrease the standby rotation speed by the slope correction value when the slope angle or the vehicle body angle indicates slope ascent. In this case, operations and effects similar to those described above can be obtained. Particularly, in a cab-over truck in which load transfer is great, it is possible to suppress insufficient steering force in slope descent and excessive steering force in slope ascent.

Since the change of the slope angle or the vehicle body angle corresponds to the change of the front axle load, the change in the front axle load is not affected or only slightly affected by a vehicle speed coefficient (vehicle speed responsiveness) and a steering speed. Accordingly, in order to suppress the effect of the front axle load change on the steering operation, increasing and decreasing the standby rotation speed corresponding to the vehicle speed has a great effect.

Hence, correcting the standby rotation speed according to the slope angle or the vehicle body angle before the rotation speed of the electric pump is corrected according to the steering operation can easily solve the problems in slope descent and slope ascent of the vehicle.

Furthermore, a vehicle for solving the problems described above is configured to be equipped with the aforementioned power steering system. This configuration can suppress both of jerky feeling in the steering operation due to insufficient steering force in slope descent and lack of response in the steering operation due to excessive steering force in slope ascent. Accordingly, the configuration is suitable for a so-called cab-over truck being a truck which has a short wheelbase and a high center of gravity and whose load becomes heavier when loaded with cargo.

Moreover, a control method of a power steering system for solving the problems described above is a control method of a power steering system including an electric pump configured to supply hydraulic oil to a steering assisting device configured to assist a steering performance of a steering wheel, and includes controlling a supply amount of the hydraulic oil by driving the electric pump such that the electric pump is set to an on-slope standby rotation speed, when a vehicle is descending or ascending a slope, the on-slope standby rotation speed calculated by correcting a standby rotation speed calculated according to a vehicle speed with a slope correction value calculated according to a slope angle or a vehicle body angle.

In this method, the standby rotation speed of the electric pump is not changed when the vehicle is horizontal (when the vehicle is not descending or ascending a slope), and is changed according to increase and decrease of the slope angle or the vehicle body angle when the vehicle is descending or ascending a slope. Accordingly, for example, it is possible to simultaneously solve the problem of insufficient steering force in slope descent and the problem of excessive steering force in slope ascent which occur in a cab-over truck.

The present invention can suppress both of jerky feeling in the steering operation due to insufficient steering force in slope descent and lack of response in the steering operation due to excessive steering force in slope ascent. Moreover, since the standby rotation speed of the electric pump in the normal state is not changed, it is possible to reduce pump loss and improve fuel consumption.

DETAILED DESCRIPTION

Figure 1:
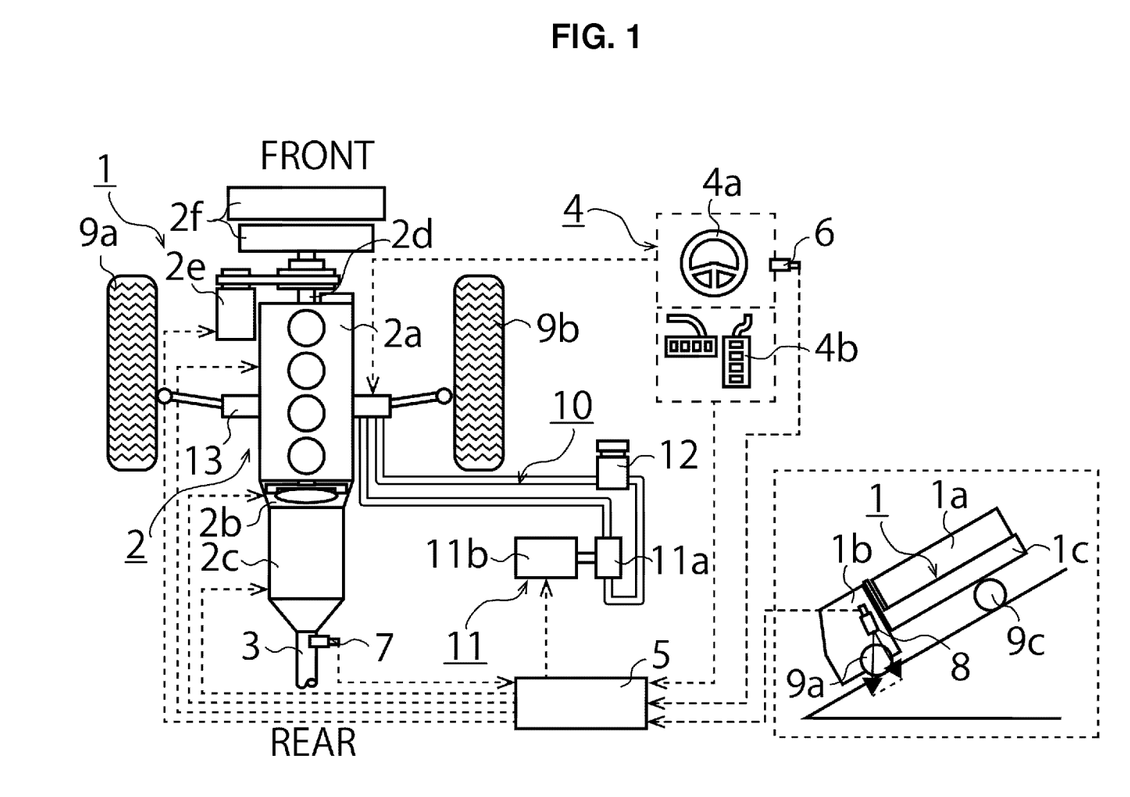
FIG. 1 is a schematic view showing a vehicle equipped with a power steering system in an embodiment of the present invention.

Power steering system embodiments of the present invention, a vehicle equipped with the power steering system, and a control method of the power steering system are described below by referring to the drawings. First, description is given of the vehicle 1 equipped with the power steering system in an embodiment of the present invention by referring to FIG. 1. Here, illustration is such that an upper side of FIG. 1 is a front side of the vehicle and a lower side of FIG. 1 is a rear side of the vehicle.

Description is given by taking a so-called cab-over truck, including a body 1a, a cab 1b, and a chassis 1c, as an example of the vehicle 1 of the embodiment. Since this cab-over truck has a short wheelbase and a high center of gravity, load transfer to front wheels is great, and the present invention is thus particularly effective when applied to the cab-over truck. However, the present invention can be also applied to a normal bonnet-type vehicle.

The vehicle 1 transmits drive force generated in a power plant 2 to a drive shaft 3 and travels by using rear wheels 9c and 9d (not illustrated) as drive wheels, the power plant 2 being formed of an engine (internal combustion engine) 2a, a clutch (drive force transmitting device) 2b, a transmission (gear shifting device) 2c, a crankshaft 2d, an alternator (power generator) 2e, and a cooling device (a radiator, a fan, and the like) 2f.

The vehicle 1 also includes a steering device 4 formed of a steering wheel (also referred to as hand wheel) 4a and foot pedals (an accelerator pedal, a brake pedal, a clutch pedal, and the like) 4b, an ECU (control device) 5 called engine control unit, a steering angle sensor 6, a vehicle speed sensor 7, and an acceleration sensor (G sensor) 8.

In addition, the vehicle 1 includes an EHPS system (electro-hydraulic power steering system) 10 which operates in conjunction with the steering wheel 4a and assists the steering wheel 4a in steering of front wheels 9a and 9b.

Although the embodiment is described by giving an example of a front-wheel steering vehicle in which the front wheels 9a and 9b are steered, the present invention can be applied to a rear-wheel steering vehicle and a four-wheel steering vehicle. Moreover, the ECU 5 is a micro controller which performs overall electric control and which handles control of the power plant 2 on the basis of information from the steering device 4 and the sensors 6 to 8 by using an electric circuit. However, a device for the control of the power plant 2 and a device for the control of the power steering system 10 may be provided separately.

Figure 2:
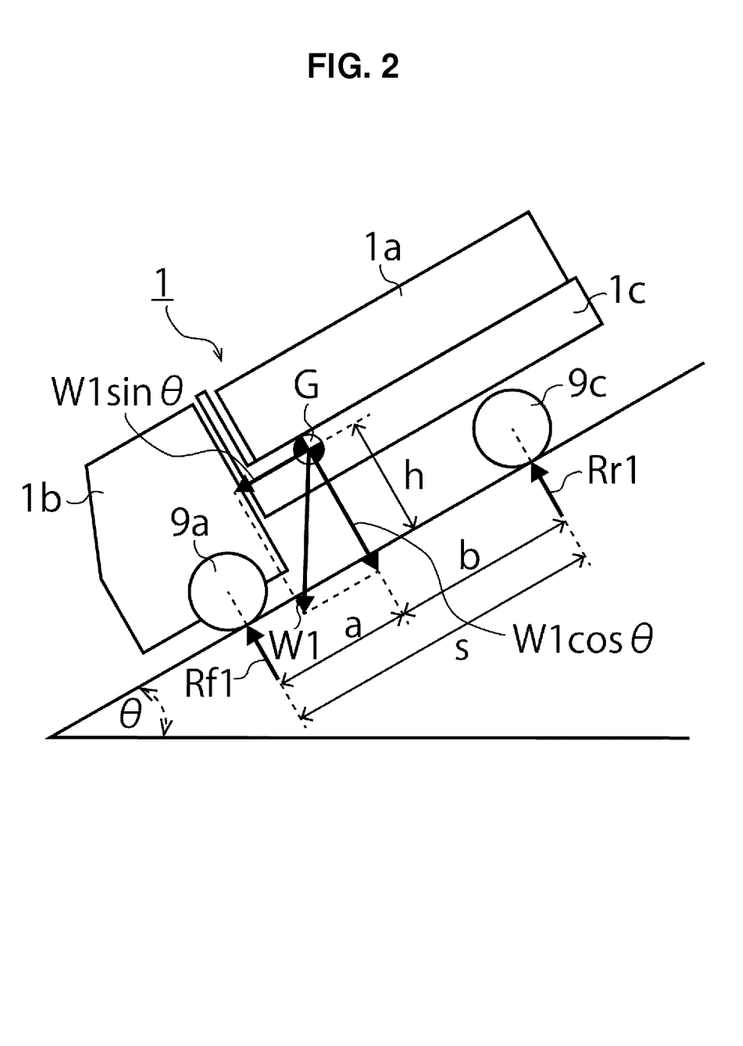
FIG. 2 is a view showing a state where the vehicle in the embodiment of the present invention is descending a slope.

Here, the forces acting on the front wheels when the vehicle 1 is travelling on a slope is described by referring to FIG. 2. In the description, W refers to the weight of vehicle 1, G refers to the center of gravity of the vehicle 1, h refers to the height of the center of gravity (the height of the center of gravity G from the slope), θ refers to the slope angle, S refers to the wheelbase (distance between a front axle and a rear axle), a refers to the distance from the center of gravity to the front axle, b refers to the distance from the center of gravity to the rear axle, and bold lines in the drawing show action of force.

A front axle load Rf1 in slope descent of the vehicle 1 can be expressed by the following formula (1).

[Formula 1]

$$Rf1 = W\cos\theta \cdot \frac{b}{S} + W\sin\theta \cdot \frac{h}{S} \quad (1)$$

From the above formula, it is found that the front axle load Rf1 in slope descent of the vehicle 1 is greater than that in a case where the vehicle 1 is travelling on a flat surface (Rf1=W·b/S). Particularly, in the cab-over truck, since the length of the wheelbase S is short relative to the entire length of the vehicle 1 and the height h of the center of gravity is high, the load transfer to the front wheels 9a and 9b is great. Moreover, since loading cargo on the body 1a further increases the height h of the center of gravity, the load transfer from the front wheels 9a and 9b becomes even greater. Furthermore, since the proportion of the distances a and b in the wheelbase S is such that a<b is satisfied, the change of the front axle load is great when the vehicle 1 travels on a slope.

A front axle load Rf2 (not illustrated) in slope ascent of the vehicle 1 can be expressed by the following formula (2).

[Formula 2]

$$Rf1 = W\cos\theta \cdot \frac{b}{S} + W\sin\theta \cdot \frac{h}{S} \quad (2)$$

From the above formula, it is found that the front axle load Rf2 in slope ascent of the vehicle 1 is smaller than that in the case where the vehicle 1 is travelling on a flat surface.

As described above, since the front axle load Rf1 increases in slope descent of the vehicle 1, steering force is increased from that in the case where the vehicle 1 is travelling on a flat surface. Moreover, since the front axle load Rf2 decreases in slope ascent of the vehicle 1, the steering force is reduced from that in the case where the vehicle 1 is travelling on a flat surface.

Next, a control method of the power steering system 10 of the present invention is described with reference to FIGS. 3 and 4. In the following description, a value calculated by the ECU 5 from a signal detected by the steering angle sensor 6 is referred to as steering speed ωn (deg/s), a value calculated by the ECU 5 from a signal detected by the vehicle speed sensor 7 is referred to as vehicle speed Vn (km/h), and a value calculated by the ECU 5 from a signal detected by the G sensor 8 is referred to as vehicle body angle θn (deg).

The control method of the power steering system 10 in the embodiment of the present invention is a method in which a standby rotation speed N0 of the system control method shown in FIG. 6 is increased and decreased according to the vehicle body angle θn before the standby rotation speed N0 and a steering correction value N1' are added to each other.

Moreover, this control method includes a first step S10 in which an electric pump 11 supplies a standby fluid (hydraulic oil) to a power steering unit 13 when steering of the steering wheel 4a is unnecessary (when the steering wheel 4a is at a neutral position) and a second step S20 in which the electric pump 11 supplies assisting fluid to the power steering unit 13 when the steering wheel 4a is steered and the power steering unit 13 assists the steering of the steering wheel 4a.

Figure 3:
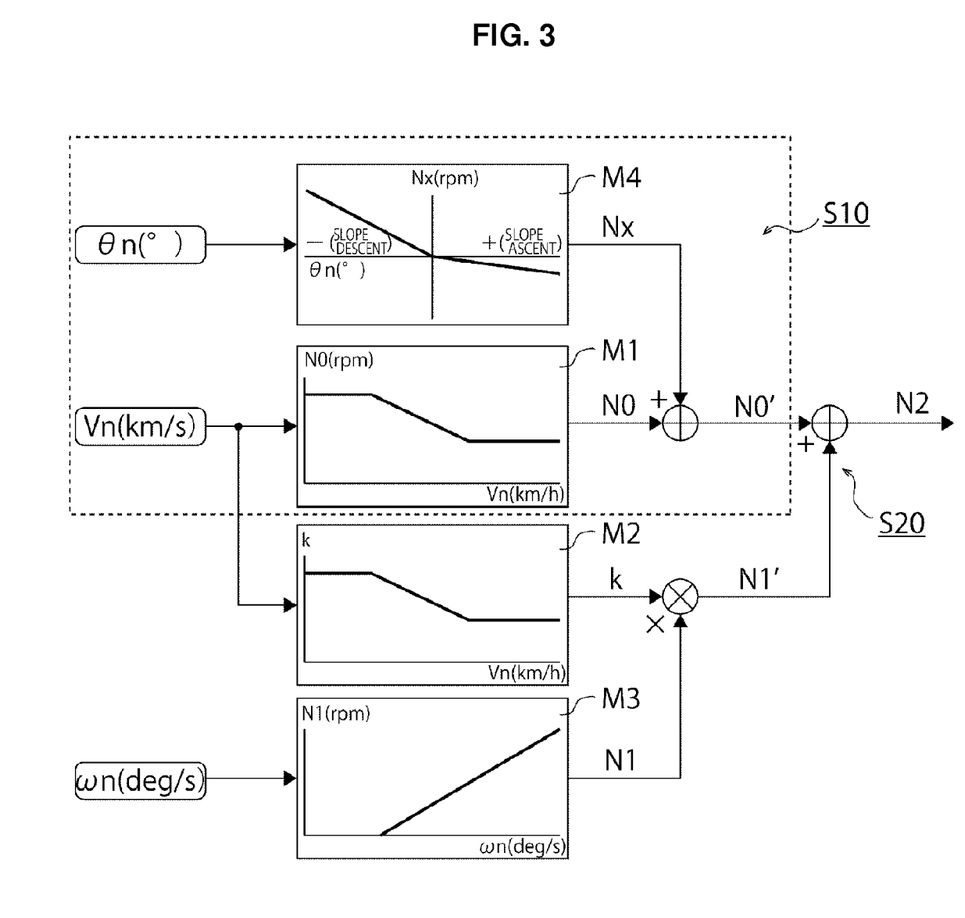
FIG. 3 is a block diagram showing a control method of a power steering system in the embodiment of the present invention.

First, as shown in FIG. 3, the first step S10 is started. When the vehicle speed sensor 7 detects the vehicle speed Vn of the vehicle 1 (step S1), a standby rotation speed map M1 specifying the standby rotation speed N0 based on the vehicle speed Vn is referred and the standby rotation speed N0 corresponding to the vehicle speed Vn is thereby calculated (step S2). Then, the rotation speed of the electric pump 11 is controlled to reach the calculated standby rotation speed N0 (step S3).

Next, when the vehicle 1 travels on a slope, the G sensor 8 detects the vehicle body angle θn which is inclined in a slope (step S4). At this time, if the G sensor 8 is installed to detect only the acceleration in a vehicle body vertical direction of the vehicle 1, the detection value of the G sensor 8 decreases according to the slope angle θ. Hence, it is possible to perform calculation using inverse trigonometric function arc-cosine and easily detect the vehicle body angle θn.

Next, a slope correction value map M4 specifying a slope correction value Nx based on the vehicle body angle θn is referred and the slope correction value Nx corresponding to the detected vehicle body angle θn is thereby calculated (step S5). Subsequently, the calculated slope correction value Nx is added to the standby rotation speed N0 and the on-slope standby rotation speed N0' is thereby calculated (step S6).

As shown in the slope correction value map M4 of FIG. 3, the slope correction value Nx takes such a value that the standby rotation speed N0 is increased (positive value), when the vehicle body angle θn indicates slope descent, i.e. when the vehicle 1 is descending a slope and the front axle load Rf1 becomes greater than that in the case where the vehicle body angle θn is zero (horizontal). Moreover, the slope correction value Nx takes such a value that the standby rotation speed N0 is reduced (negative value), when the vehicle body angle θn indicates slope ascent, i.e. when the vehicle 1 is ascending a slope and the front axle load Rf2 becomes smaller than that in the case where the vehicle body angle θn is zero.

Moreover, the decrease/increase value of the slope correction value Nx should be determined based on the proportion in the wheelbase S. In a cab-over truck, since change in the front axle load in slope descent is great when the proportion in the wheelbase S is such that a<b is satisfied, the slope correction value Nx should be increased in the slope correction value map M4 when the vehicle body angle θn indicates slope descent of the vehicle 1. Meanwhile, the slope correction value Nx should be decreased when the vehicle body angle θn indicates slope ascent of the vehicle. In this case, when the proportion in the wheelbase S is such that a<b is satisfied, the absolute value of the slope correction value Nx in slope descent is greater than the absolute value of the slope correction value Nx in slope ascent.

Figure 4:
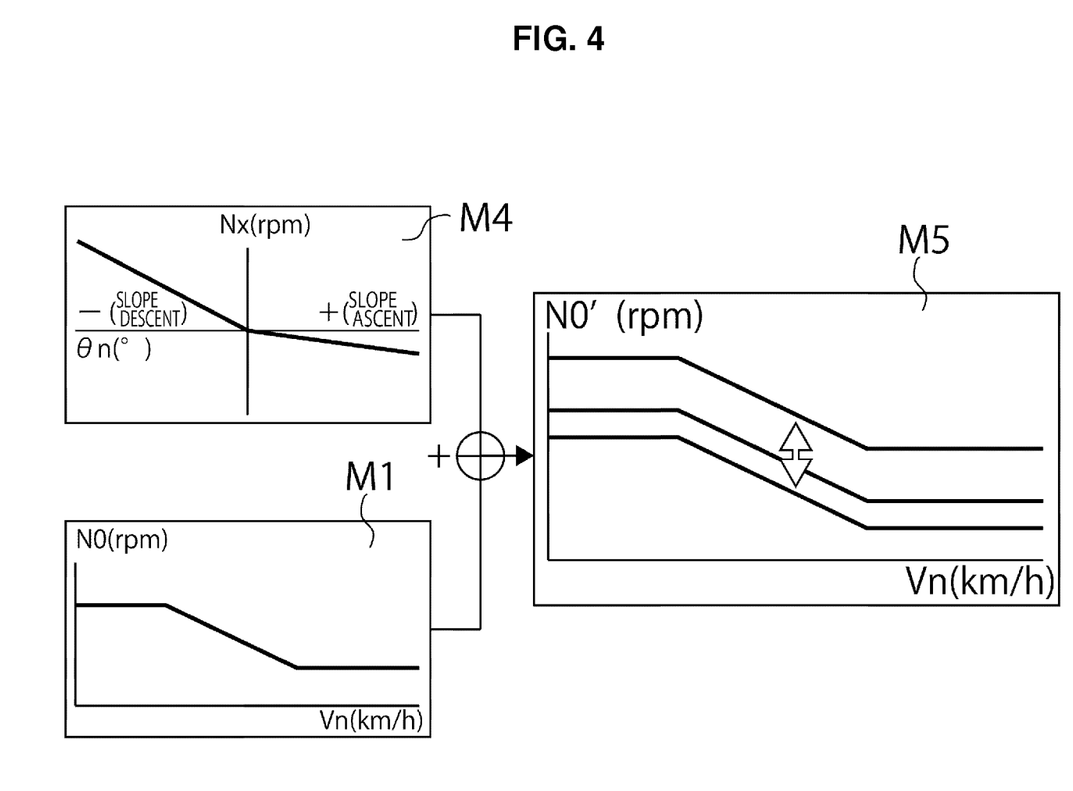
FIG. 4 is a view showing a standby rotation speed map and a slope correction value map which are shown in FIG. 3.

Here, a map showing that the on-slope standby rotation speed N0' increases and decreases according to the vehicle body angle θn is shown in FIG. 4. It is found from a map M5 obtained by adding the standby rotation speed map M1 and the slope correction value map M4 to each other that, as described above, the on-slope standby rotation speed N0' increases in slope descent of the vehicle 1 and decreases in slope ascent of the vehicle 1. Instead of performing steps S5 and S6, the on-slope standby rotation speed N0' may be calculated by using the on-slope standby rotation speed map M5 based on the vehicle speed Vn and the vehicle body angle θn.

After the on-slope standby rotation speed N0' is calculated, the rotation speed of the electric pump 11 is controlled to reach the calculated on-slope standby rotation speed N0' (step S7) and the first step S10 is thus completed.

When the first step S10 is completed and the steering wheel 4a is steered, the second step S20 described in FIG. 6 is started. At this time, when the vehicle 1 is travelling on a slope, the steering correction value N1' is added to the on-slope standby rotation speed N0' calculated in the aforementioned first step S10 and a target rotation speed N2 is thereby calculated. Then, the rotation speed of the electric pump 11 is controlled to reach the calculated target rotation speed N2 and the second step S20 is completed.

Meanwhile, when the vehicle 1 is travelling on a horizontal surface, since the slope correction value Nx is zero, the steering correction value N1' is added to the standby rotation speed N0 and the target rotation speed N2 is thereby calculated. Then, the rotation speed of the electric pump 11 is controlled to reach the calculated target rotation speed N2 and the second step S20 is completed.

According to the aforementioned control method, the supply amount of the standby fluid supplied from the electric pump 11 to the power steering unit 13 can be increased or decreased according to the vehicle body angle θn before the assist force of the power steering unit 13 in the operation of the steering wheel 4a is increased or decreased. Hence, it is possible to suppress jerky feeling due to insufficient steering force in slope descent and lack of response due to excessive steering force in slope ascent.

Moreover, the difference between the on-slope standby rotation speed N0' and the target rotation speed N2 is smaller than a difference in the case where the slope correction value Nx corresponding to the vehicle body angle θn is added upon the steering of the steering wheel 4a. Hence, it is possible to improve responsiveness of the power steering unit 13 in the slope descent and ascent of the vehicle 1.

This is due to the following reason. Since the change in the vehicle body angle θn corresponds to the change in the front axle load, the change in the front axle load is not affected or only slightly affected by a vehicle speed coefficient k and the steering speed ωn in the second step S20. Accordingly, in order to suppress the effect of the front axle load change on a steering operation, increasing and decreasing the standby rotation speed N0 corresponding to the vehicle speed Vn has a great effect.

In addition, when the vehicle 1 is travelling on not a slope but a substantially-horizontal road, the electric pump 11 is driven at the standby rotation speed N0. Accordingly, it is possible to reduce pump loss and improve fuel.

In the aforementioned control method, the steering correction value N1' is calculated based on the signal detected by the steering angle sensor 6 and the target rotation speed N2 is thereby calculated. In addition to this, it is possible to add steps of suppressing a seizure phenomenon in the power steering unit 13, kickback in straight travelling, and wobbling of the front wheels 9a and 9b due to disturbance such as unevenness of a road surface. In this case, feed forward control is preferably performed such that difference between the actual rotation speed of the electric pump 11 and the target rotation speed N2 does not increase, with factors other the operation of the steering wheel 4a taken as disturbance.

Moreover, although the G sensor 8 is used in the embodiment, an angle sensor capable of directly detecting the slope angle θ may be used instead of the G sensor 8. In this case, in step S5, a slope correction value map specifying the slope correction value Nx based on the slope angle θ is referred and the slope correction value Nx corresponding to the detected slope angle θ is thereby calculated.

Since the present invention can suppress both of jerky feeling in the steering operation due to insufficient steering force in slope descent of the vehicle and lack of response in the steering operation due to excessive steering force in slope ascent of the vehicle, the present invention can be used particularly in a vehicle such as a cab-over truck with a short wheelbase and a high center of gravity.

The invention claimed is:

1. A power steering system including:
an electric pump configured to supply hydraulic oil to a steering assisting device configured to assist a steering performance of a steering wheel; and
a first controller configured to control a supply amount of the hydraulic oil by a rotation speed of the electric pump,
wherein the first controller calculates an on-slope standby rotation speed and controls the electric pump such that the electric pump rotation speed is set to the on-slope standby rotation speed before the steering wheel is steered, when a vehicle is descending or ascending a slope, and
wherein the on-slope standby rotation speed is calculated by correcting a standby rotation speed of the electric pump corresponding to a vehicle speed with a slope correction value calculated according to a slope angle or a vehicle body angle.

2. The power steering system according to claim 1, further comprising:
a second controller to calculate a steering target rotation speed and to control the electric pump such that the electric pump is set to the steering target rotation speed, when the steering wheel is steered after the control by the first controller,
wherein the steering target rotation speed is calculated by correcting the on-slope standby rotation speed with a steering correction value corresponding to at least steering of the steering wheel.

3. A vehicle equipped with the power steering system according to claim 1.

4. A vehicle equipped with the power steering system according to claim 2.

5. The power steering system according to claim 1, wherein the on-slope standby rotation speed becomes larger than the standby rotation speed in the slope descending and becomes smaller than the standby rotation speed in the slope ascending.

6. The power steering system according to claim 2, wherein the on-slope standby rotation speed becomes larger than the standby rotation speed by the slope correction value in the slope descending and becomes smaller than the standby rotation speed by the slope correction value in the slope ascending.

7. The power steering system according to claim 1, wherein the first controller calculates the slope correction value according to a weight of the vehicle, one of the slope angle or the vehicle body angle, a wheelbase of the vehicle, a distance from a center of gravity to the front axle of the vehicle, and a distance from the center of gravity to the rear axle of the vehicle.

8. The power steering system according to claim 2, wherein the first controller calculates the slope correction value according to a weight of the vehicle, one of the slope angle or the vehicle body angle, a wheelbase of the vehicle, a distance from a center of gravity to the front axle of the vehicle, and a distance from the center of gravity to the rear axle of the vehicle.

9. The power steering system according to claim 5, wherein the first controller calculates the slope correction value according to a weight of the vehicle, one of the slope angle or the vehicle body angle, a wheelbase of the vehicle, a distance from a center of gravity to the front axle of the vehicle, and a distance from the center of gravity to the rear axle of the vehicle.

10. The power steering system according to claim 7, wherein, when the distance from the center of gravity to the front axle is smaller than the distance from the center of gravity to the rear axle, an absolute value of the slope correction value in the slope descending is set larger than the absolute value of the slope correction value in the slope ascending.

11. The power steering system according to claim 8, wherein, when the distance from the center of gravity to the front axle is smaller than the distance from the center of gravity to the rear axle, an absolute value of the slope correction value in the slope descending is set larger than the absolute value of the slope correction value in the slope ascending.

12. The power steering system according to claim 9, wherein, when the distance from the center of gravity to the front axle is smaller than the distance from the center of gravity to the rear axle, an absolute value of the slope correction value in the slope descending is set larger than the absolute value of the slope correction value in the slope ascending.

13. A control method of a power steering system including an electric pump configured to supply hydraulic oil to a steering assisting device configured to assist a steering performance of a steering wheel, the control method comprising:
controlling the electric pump such that the electric pump rotation speed is set to an on-slope standby rotation speed before the steering wheel is steered by
detecting a slope angle or a vehicle body angle when a vehicle is descending or ascending a slope,
calculating a slope correction value according to the detected slope angle or the vehicle body angle, and
calculating the on-slope standby rotation speed by correcting a standby rotation speed of the electric pump corresponding to a vehicle speed with the slope correction value.

* * * * *